United States Patent [19]

Morley

[11] Patent Number: 5,774,080
[45] Date of Patent: Jun. 30, 1998

[54] REDUCED TRANSISTOR-COUNT DATA STORAGE AND MULTIPLEXING SYSTEM

[75] Inventor: Sean Morley, Limerick, Ireland

[73] Assignee: Analog Devices, Incorporated, Norwood, Mass.

[21] Appl. No.: 356,496

[22] Filed: Dec. 15, 1994

[51] Int. Cl.[6] .................................................. H03M 9/00
[52] U.S. Cl. ............................................................ 341/101
[58] Field of Search .................................. 341/100, 101; 327/407, 408; 377/70, 74, 75, 77, 78

[56] References Cited

U.S. PATENT DOCUMENTS

| | | | |
|---|---|---|---|
| 4,231,023 | 10/1980 | Warner | 340/347 |
| 4,473,819 | 9/1984 | Minakuchi | 340/347 |
| 4,992,727 | 2/1991 | Simpson et al. | 324/158 |
| 5,122,738 | 6/1992 | Simpson et al. | 324/158 |
| 5,164,612 | 11/1992 | Kaplinsky | 307/272.2 |
| 5,168,463 | 12/1992 | Ikeda et al. | 365/78 |
| 5,230,014 | 7/1993 | Benhamida | 377/75 |
| 5,247,195 | 9/1993 | Turner | 257/203 |
| 5,250,859 | 10/1993 | Kaplinsky | 307/465 |
| 5,427,461 | 6/1995 | Hirai | 400/279 |

FOREIGN PATENT DOCUMENTS

| | | | |
|---|---|---|---|
| 004140686 | 6/1992 | Germany | 341/100 |
| 57-044328 | 3/1982 | Japan . | |
| 405327521 | 10/1993 | Japan | 341/100 |
| 405327521 | 12/1993 | Japan | 341/100 |

*Primary Examiner*—Brian K. Young
*Attorney, Agent, or Firm*—Parmelee & Bollinger, LLP

[57] ABSTRACT

A data transmission system wherein a datastream of digital words is processed in two parallel pipelined datapaths with the logical operations being performed at a clock rate which is a fraction of some other clock rate identified as a main clock rate. The outputs of the datapath logic are directed respectively to T-latch storage registers the outputs of which are directed at the fractional clock rate to corresponding inputs of a multiplexer serving to combine the two datastreams into a single datastream at the main clock rate. The multiplexer is clocked in synchronism with the T-latch clocks in timed sequence to prevent the development of a transparent path between either T-latch input and the multiplexer output.

13 Claims, 8 Drawing Sheets

REDUCED TRANSISTOR-COUNT DATA STORAGE AND MULTIPLEXING SYSTEM

BACKGROUND OF THE INVENTION

1. Field of the Invention

This invention relates to pipelined data transmission systems. More particularly, this invention relates to data transmission systems of the type wherein there are multiple streams of digital data to be combined into a single stream.

2. Description of the Prior Art

Referring first to FIG. 1, there is shown a section of a typical pipelined datapath. The input data is received in a register made up of flip-flops one of which is shown and identified as R1. The data is then operated upon by the data-path logic 20, and the result is registered in a second register R2.

The datapath logic 20 typically consists of adders, multipliers, decoders, multiplexers, ram (random access memory), etc. The maximum clock frequency of the pipeline is limited by the propagation delay (T1, shown in FIG. 2) from the active clock edge through the datapath. If the complexity of the datapath is such that the maximum clock frequency of operation does not meet the target speed requirements for the pipeline, there are a number of options that can be pursued. All of the options to be described hereafter assume that the number of clock cycles taken for the data to travel through the pipeline is not an issue. There are only a restricted number of applications where this assumption would not apply.

One option has been to split the datapath into two or more series operations, and insert a register between each operation. An example of this is shown in FIG. 3. The propagation delay through each operation is shorter than the original datapath and so the pipeline will operate at a higher clock frequency. Frequently this is the option that is chosen, but there are situations where this is an inefficient option.

One such situation is where the number of bits on the datapath (the 'width' of the datapath) is not constant. An example of this would be a datapath where the input is 8-bits wide, and part of the datapath is an 8-to-256 decoder. This 256-bit word could select a word in a RAM block whose output is 8-bits wide. The datapath width has gone from 8-bits to 256-bits, and back to 8-bits. To split this datapath in two would require the use of a 256-bit register, which would take up such a large amount of die area as to be considered excessively inefficient. In such a situation, it may be more appropriate to repeat the datapath in two parallel operations, each running at half the maximum frequency. An example of this is shown in FIG. 4.

In FIG. 4, the pipeline is made up of two identical parallel sub-pipelines generally indicated at 22, 24. Each sub-pipeline is clocked by a clock whose frequency is half that of the main pipeline clock. The sub-pipelines are clocked by anti-phase clocks, so alternate words in the input datastream are clocked into the A sub-pipeline (22) and the B sub-pipeline (24). As the sub-pipelines are being clocked respectively by half the main pipeline clock frequency, each word has now got two main clock periods to propagate through the datapath logic, as shown in FIG. 5.

As the flip-flops of the second register bank (R2A and R2B) are clocked by anti-phase clocks, their outputs Q2A and Q2B (FIG. 5) appear separated by one main clock cycle. A multiplexer 28 (labelled mux in FIG. 4) is used to combine the two half-rate datastreams at the outputs of the second register bank (R2A, R2B) into one datastream at the same rate as the input data rate.

It can be seen from the timing diagram in FIG. 5 that there are two main clock periods from the time each input is registered until it appears at the output. This architecture is sometimes referred to as a "ping-pong" architecture, as the output datastream is generated by alternating between two half-rate datastreams.

Generally, this ping-pong architecture would occupy twice as much die area as the single pipeline, to gain a two fold increase in clock speed. It is only used in situations where splitting the datapath into series operations (FIG. 3) is more inefficient in terms of die area, or where the speed performance is so critical that it overrides the penalty in die area.

The internal details of a conventional implementation of the second register bank R2A, R2B of FIG. 4 are presented in FIGS. 6A and 6B. FIG. 6B shows that the D-type flip-flops of the registers comprise separate master-slave flip-flops. In a master-slave type of flip-flop, there is at no time a direct path from the input to the output. This is because the master-slave has two switches in the path between its input and output, and the control signals for these two switches are complementary. (FIG. 6C explains the symbols used in FIG. 6B to describe this complementary switch functioning.) Thus, when one switch is open the other is closed, so no logic hazard can arise from inadvertent development of a transparent datapath from register input to the output of the mux. Although this conventional implementation of parallel sub-pipelines is effective in performance, it is relatively costly in its use of die area.

SUMMARY OF THE INVENTION

In preferred embodiments of the invention, to be described hereinbelow in detail, there are provided pipelined data transmission systems which have reduced transistor-count relative to conventional systems, and therefore require less die area than heretofore. In these new systems, the usual D-type flip-flop registers (with its master-slave sub-sections) are eliminated, and their function is provided by T-latches (i.e., "transparent" latches). In a T-latch, as is well known, during half of the clock period data can pass directly from the input to the output. Thus, the T-latch does not have the D-type flip-flop master-slave property whereby one switch in the datapath always will be open (thereby assuring high resistance to logic hazards). For that reason, pipelines designed with T-latches typically have been more prone to logic hazards. However, it has been found that this disadvantage can be nullified by means of the present invention. In preferred embodiments of this invention, the T-latches are combined with a multiplexer (mux) to merge their output datastreams, and the mux operation is controlled by clock signals synchronized with the T-latch clocks and in a timed sequence which prevents establishment of any closed path through the T-latches to the mux output where the two streams of sub-pipeline data are combined into a single stream.

More specifically, it has been found that in a ping-pong type of architecture, where the two storage elements are followed by a multiplexer whose select input is the same as the clock signal to the storage elements, T-latches can safely be used as the storage elements. This is because the presence of the multiplexer, when its select input is activated as described, prevents development of a transparent path from the register inputs to the output of the mux. The combination of T-latches and a so-activated mux results in a system wherein there are two switches serially in the path from input of the T-latch to the output of the mux, and these two switches have complementary control signals. Thus, whenever latch A is transparent (closed), the mux is selecting the output of latch B to the output, and vice versa. Accordingly, the T-latches can be safely used as part of such a system.

The inventive concept described above makes it possible to employ T-latches as storage registers when they are used in combination with a multiplexer activated as described, thereby reducing the number of transistors as compared to a conventional system, and also reducing the required die area.

Other objects, aspects and advantages of the invention will in part be pointed out in, and in part apparent from, the following description of preferred embodiments considered together with the accompanying drawings.

DETAILED DESCRIPTION OF PREFERRED EMBODIMENTS

Figure 1:
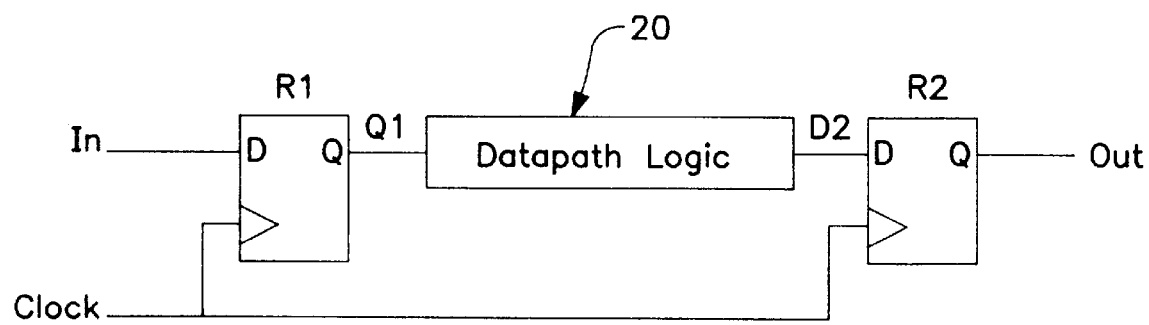
FIG. 1 illustrates in general block diagram format a typical pipelined data transmission system.
Figure 2:
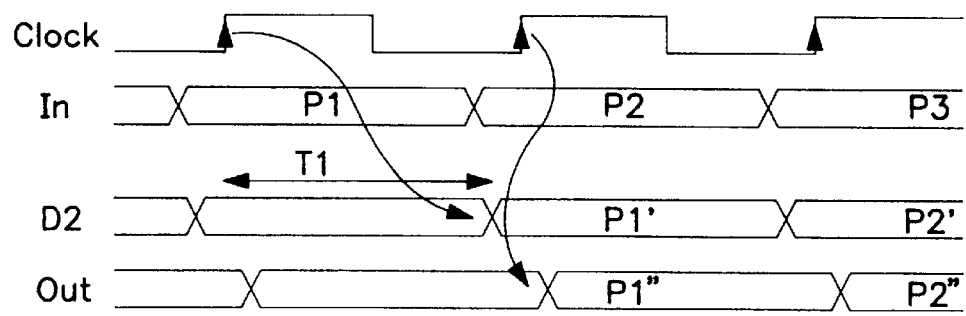
FIG. 2 is a timing diagram for the system of FIG. 1.
Figure 3:
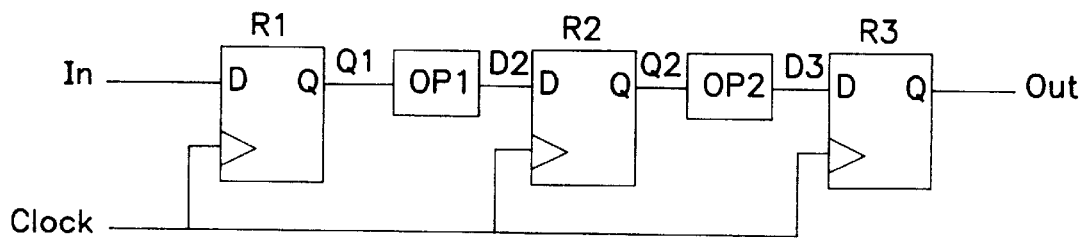
FIG. 3 illustrates a typical pipelined data transmission system subdivided into series operations.
Figure 4:
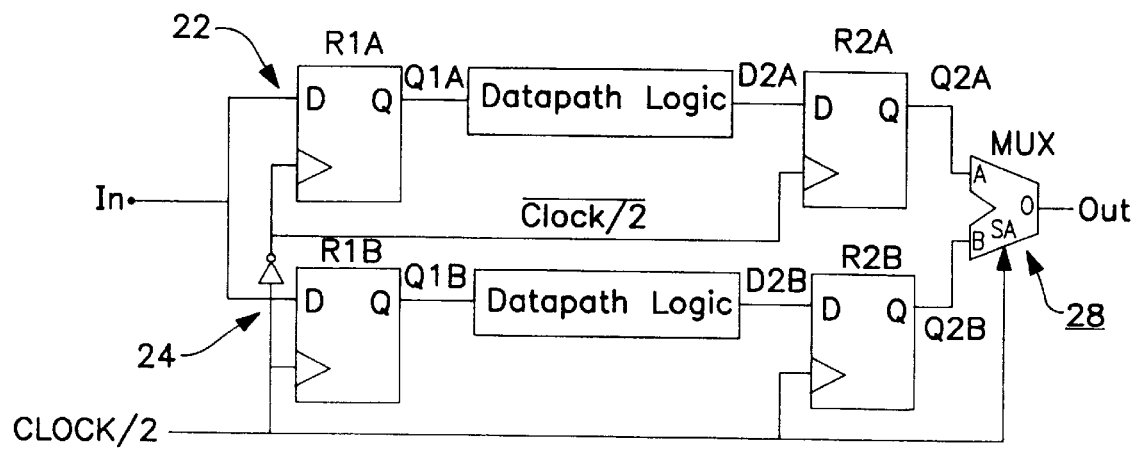
FIG. 4 illustrates a typical pipelined data transmission system split into two parallel sub-pipelines.
Figure 5:
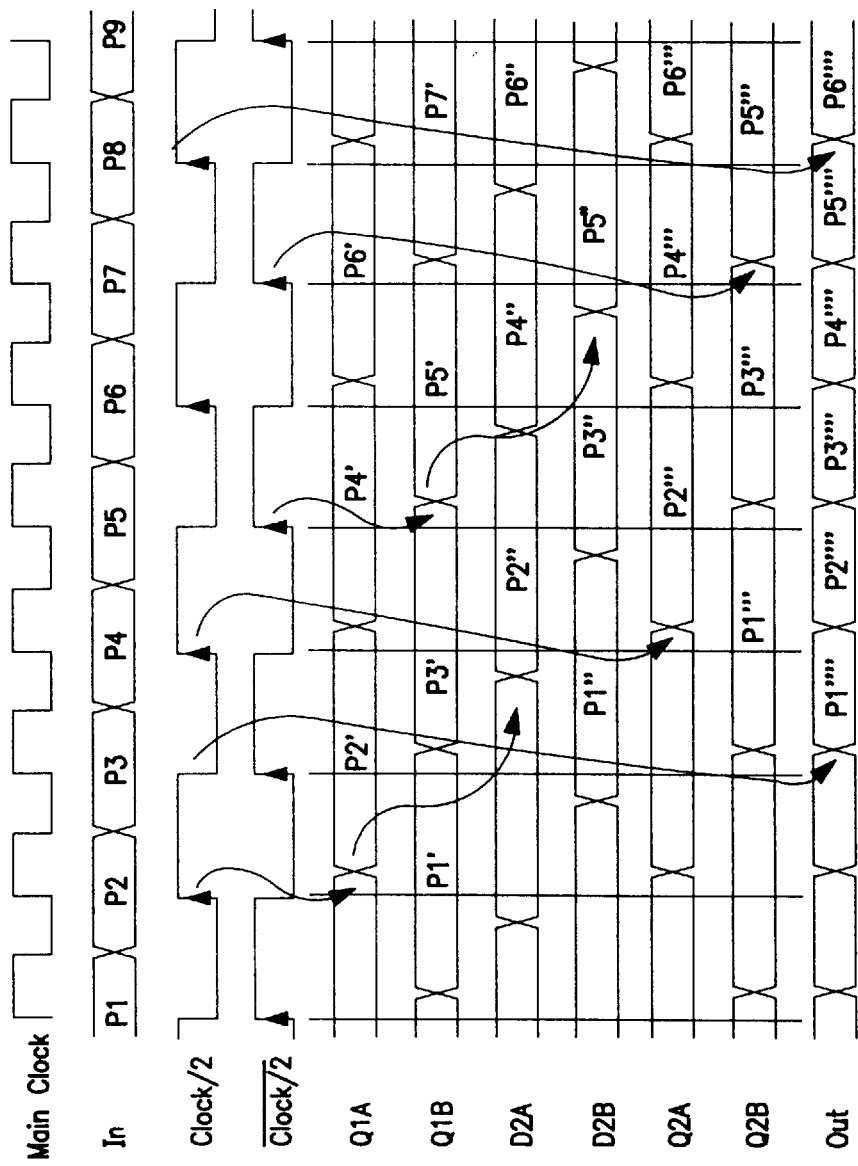
FIG. 5 is a timing diagram for the system of FIG. 4.
Figure 6A:
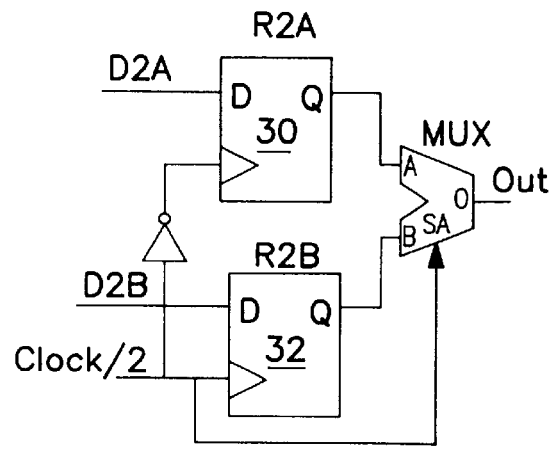
FIGS. 6A and 6B show details of a portion of the prior art system of FIG. 4.
Figure 7A:
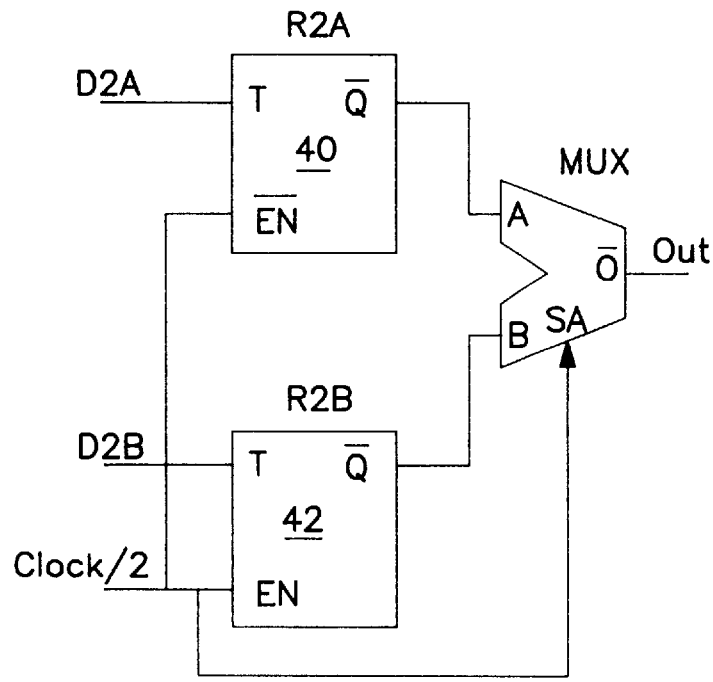
FIGS. 7A and 7B show a data storage and multiplexer system incorporating the present invention.
Figure 7B:
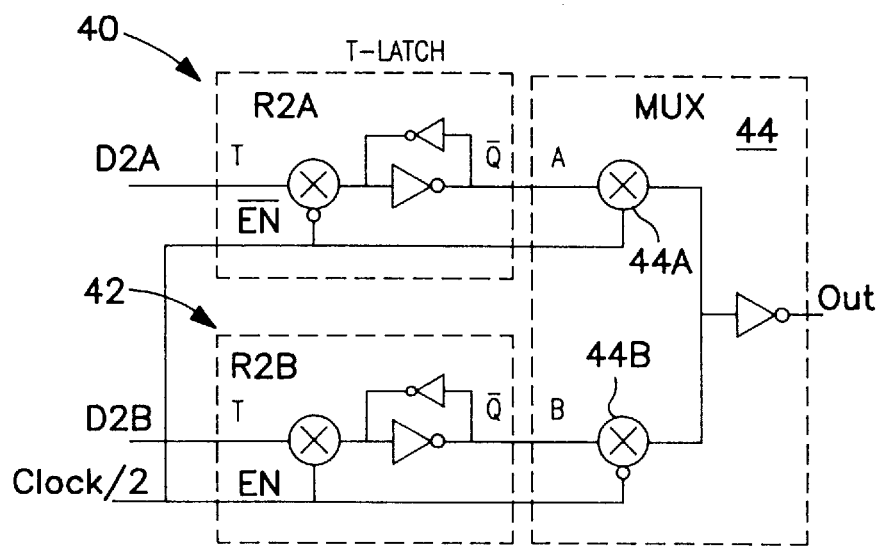

Referring now to FIG. 7A, one presently preferred arrangement of the invention includes a pair of T-latches 40, 42 to which are connected the input data lines D2A, D2B from the FIG. 4 system; that is, the circuit in FIG. 7A replaces the circuit of FIG. 6A. Both of these latches 40, 42 are supplied at their enable terminals $\overline{EN}$ and EN with clock pulses occurring at half the frequency of the main system clock, and designated Clock/2. As shown in FIG. 7B, each of these T-latches 40, 42 includes only a single switched register section. Thus, in a T-latch, for half of the clock period data can pass directly from the latch input to its output. This is because the latch has no internal facility for preventing a transparent datapath through the T-latch during that half of the clock period, as there is in the case of a two-switch master-slave D-type flip-flop described above.

However, as shown in FIG. 7B, the multiplexer 44 and the T-latches are activated by clock pulses which are in synchronism and in timed sequence so as to prevent the development of any transparent data path from the inputs of the T-latches to the output of the multiplexer. More specifically, the clock signals provide anti-phase operation of the T-latch and the multiplexer switches 44A, 44B, as indicated by the bubble symbol on two of the lower switches (see FIG. 6C for symbolic explanation). The closures of switches 44A, 44B are synchronized with activation of the T-latch switches in such a way that whenever latch A is closed (transparent) the multiplexer is selecting latch B, and vice versa. Thus, the T-latches can by these means be safely used as storage registers, thereby reducing transistor count and die area as compared with the system of FIG. 6B.

Figure 8:
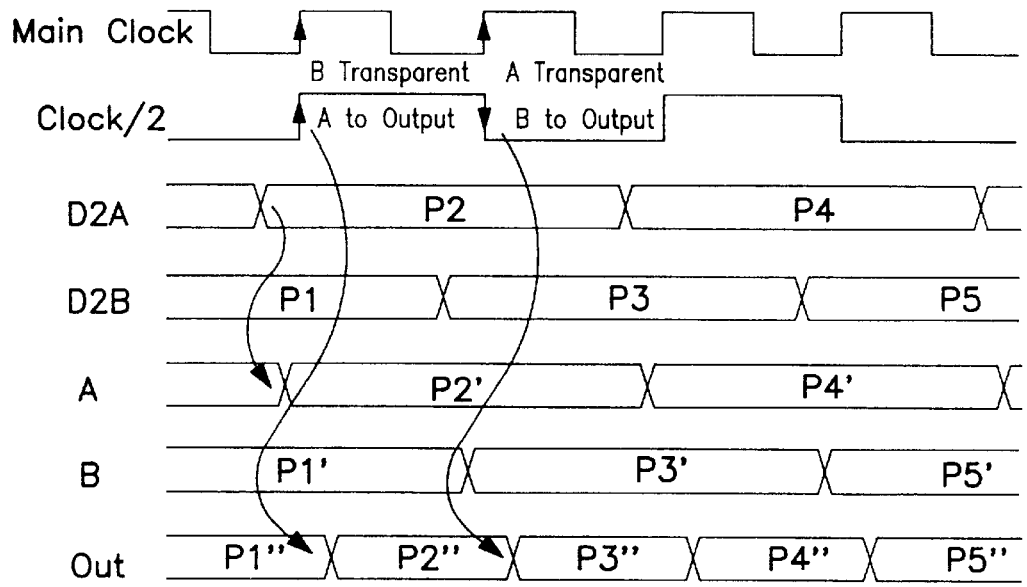
FIG. 8 is a timing diagram for the apparatus of FIGS. 7A and 7B.

FIG. 8 presents a timing diagram showing the interrelated operation of the separate parts of the FIG. 7B circuit. The "A" input is latched on the rising Clock/2 edges, and appears at the output following the same clock edges. The "B" input is latched on falling Clock/2 edges, and appears at the output following the same clock edges. Thus, whenever latch "A" is transparent (closed), the mux is selecting the output of latch B to the output and vice versa. Accordingly, the presence of the multiplexer, so-activated, prevents the development of clear (transparent) paths through the T-latch inputs to the mux output.

Different transistor-level implementations for the T-latches and multiplexer in FIG. 7B could be used to achieve the same result. The basic point is that T-latches can safely be used as storage elements in a ping-pong datapath if they are followed by a multiplexer the select input of which is such that a transparent path never exists from any of the T-latch inputs to the output of the mux.

Figure 6B:
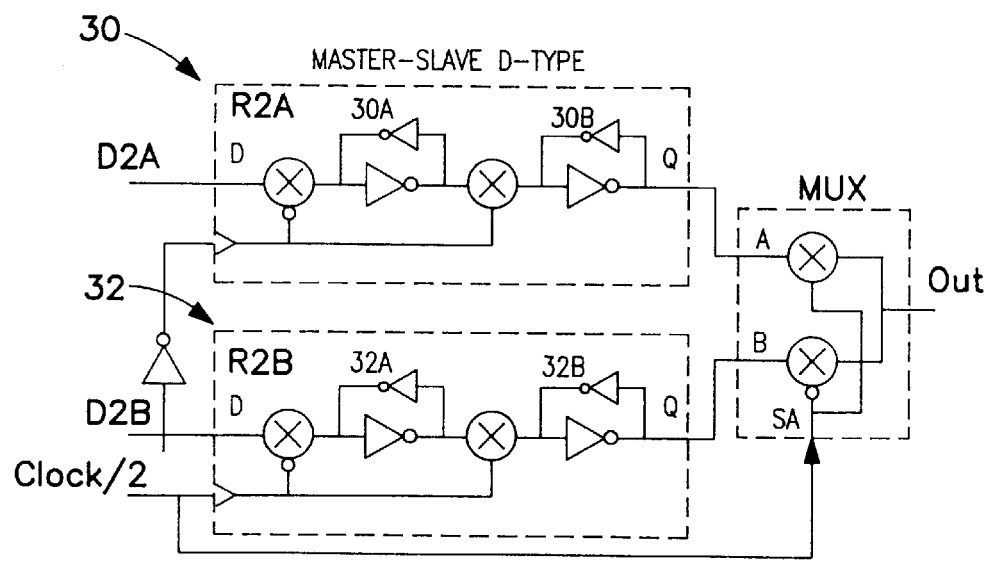
Figure 6C:
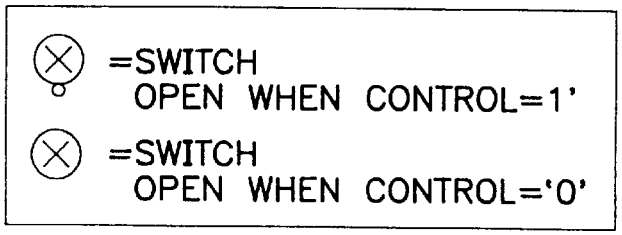
FIG. 6C is a diagram indicating the significance of certain symbols used in FIGS. 6B, 7B and 12.

In comparison with the circuit of FIG. 6B, the circuit of FIG. 7B has been reduced in transistor count by the equivalent of two T-latches. The output propagation delay has also been slightly reduced by the amount of time necessary to propagate through a switch. The circuit also will have reduced power dissipation due to the reduced number of transistors, and to the reduced load on the clock input.

A somewhat modified embodiment of the invention can be employed when implemented as part of a RAMDAC. The input port or "pixel port" on a high-speed RAMDAC typically consists of a number of parallel datastreams each running at a clock rate lower than the main RAMDAC clock rate. The input data is usually two parallel streams at half the main clock rate, or four parallel streams at one quarter the main clock rate. The reason for using this type of input port is that it is much easier for the system designer to generate multiple parallel datastreams at some fraction of the main clock rate, than to generate a single datastream at the main clock rate.

This type of pixel port is known as a multiplexed pixel port. On previous RAMDACs, the first operation to be carried out, once the multiple datastreams were registered at the input, was to multiplex them into a single datastream at the main clock rate. This was done in a similar fashion to the way the outputs of the ping-pong datapath are combined into a single datastream in FIG. 6B. This full-rate datastream was then processed through the different stages of the pipelined datapath at the full clock rate.

Due to the increased complexity in the modern RAMDAC chips, it is advantageous to use a ping-pong datapath architecture for the first pipeline stage after the input register, in order to meet speed requirements. This ping-pong datapath would operate a little differently from the one shown in FIG. 4 where the diagram shows a datapath where the input full-rate datastream is split into two half-rate datastreams by clocking the two input registers at half the clock rate and in anti-phase to each other. Instead, the pixel port may be arranged to receive input data that has already been split into multiple lower-rate datastreams. Rather than immediately combining the parallel datastreams at the outputs of the input register into a single full-rate datastream, the datastreams can be processed in parallel through the first pipeline stage, and combined into a single full-rate datastream afterwards. Such an arrangement is illustrated in FIG. 9, and its timing diagram is shown in FIG. 10.

Figure 9:
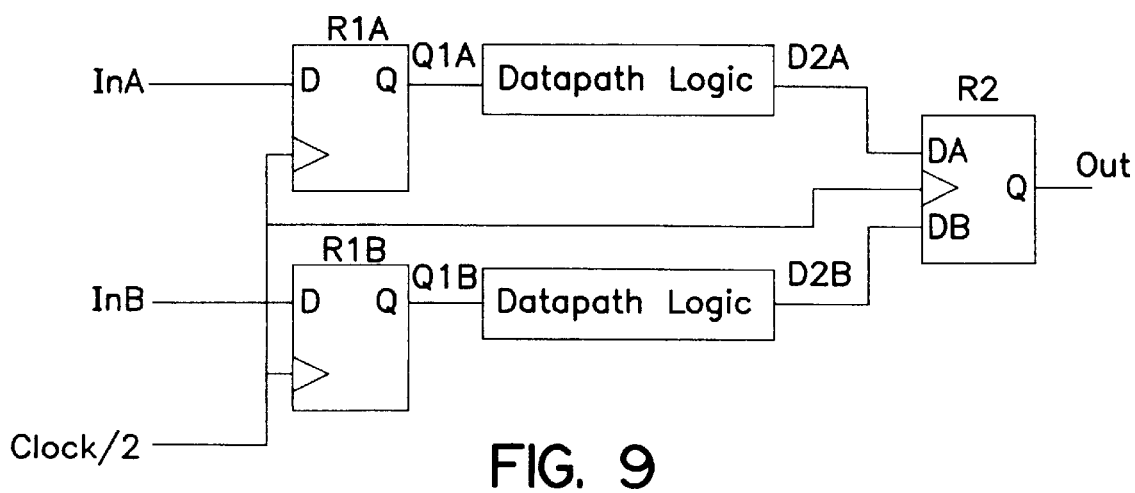
FIG. 9 shows a modified system in outline.
Figure 10:
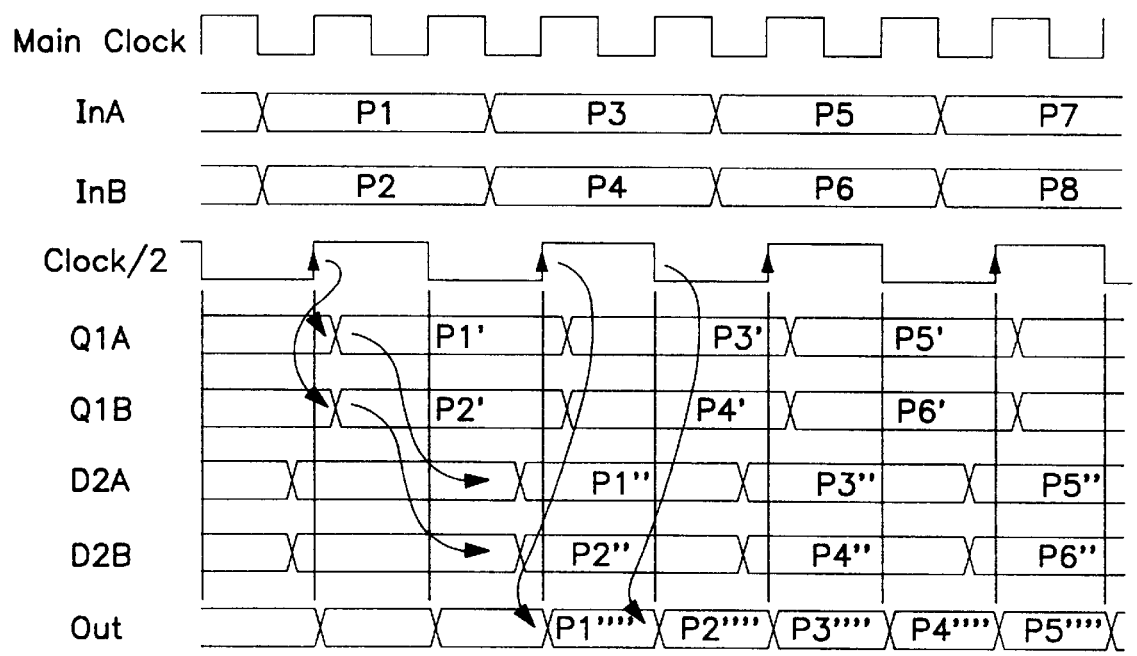
FIG. 10 is a timing diagram for FIG. 9.
Figure 11:
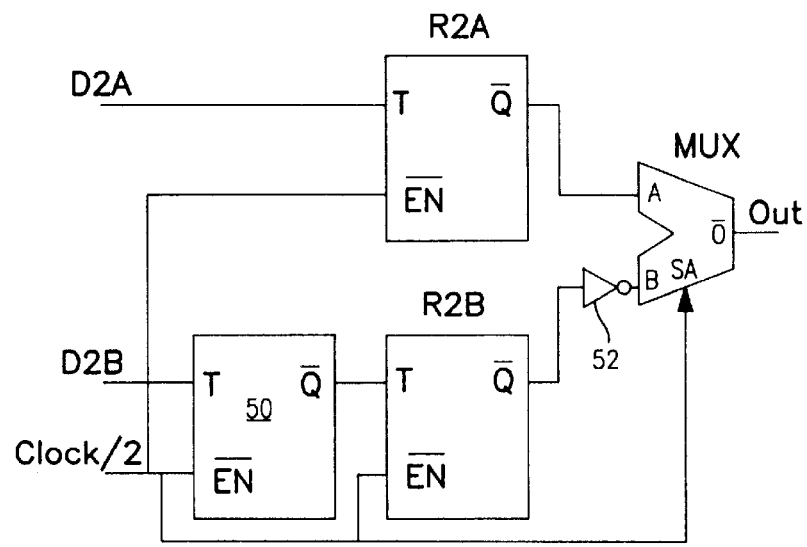
FIG. 11 is a block diagram showing details of the output circuit and multiplexer for the system of FIG. 9.
Figure 12:
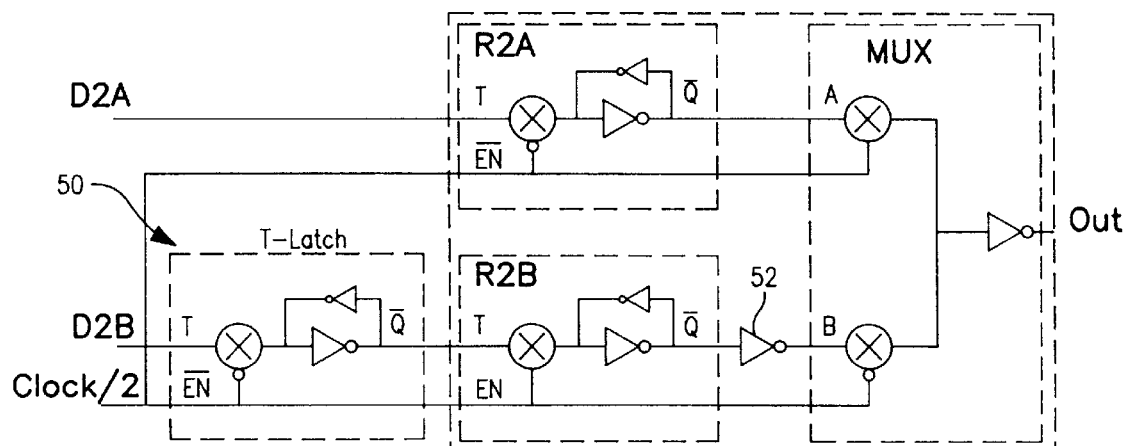
FIG. 12 shows further details of the apparatus of the system of FIG. 11.

FIGS. 11 and 12 show details of the portion of the FIG. 9 circuit which is used to combine the outputs of the ping-pong datapath into one datastream at the main clock rate. FIG. 11 presents the circuit portion in block diagram format, and FIG. 12 shows internal details of the circuitry. It may be noted that the datapath in FIG. 4 processes two half-rate datastreams in parallel, but offset in time by a main clock cycle. In contrast, the datapath in the FIGS. 11 and 12 arrangement processes two half-rate datastreams in parallel, but both at the same time. The flip-flop that combines the two datastreams into one must latch the A and B inputs on the same clock edge, and output them on alternating clock edges. An extra T-latch 50 in front of the circuit to receive the D2B data achieves this. An extra inverter 52 is added in the 'B' path to compensate for the inversion added by the extra T-latch.

This circuit takes advantage of the fact that T-latches can be safely used as storage elements in a ping-pong datapath, because the T-latches are followed by a mux whose select input is the same as the clock to the T-latches, so as to prevent a transparent path from input to output.

Although presently preferred embodiments of the invention have been described in detail, it is to be understood that this is for the purpose of illustrating the invention, and should not be construed as necessarily limiting the scope of the invention since it is apparent that many changes can be made by those skilled in the art while still practicing the invention claimed herein.

I claim:

1. A data transmission system having at least two pipelined data paths and comprising, in combination:

input means to receive a datastream at a main clock frequency rate;

said input means comprising at least first and second register means operable by clock signals at a fraction of said main clock frequency to store alternate words of said data stream in said register means respectively;

at least first and second datapath logic means for processing the data words from said first and second register means respectively;

at least first and second T-latches having their inputs connected to the outputs of said first and second data path logic means respectively and operable by clock signals at said fraction of said main clock frequency to store the processed data words; and a multiplexer having first and second inputs coupled to the outputs of said first and second T-latches respectively to receive the stored data words and to merge the datastreams from said T-latches into a single datastream;

said multiplexer being activated by clock signals synchronized with said T-latch clock signals and in timed sequence to prevent the development of a transparent path between the T-latch inputs and the multiplexer output.

2. Apparatus as claimed in claim 1, and including;

first and second switches in said T-latches respectively and receiving the inputs thereof;

first and second switches in said multiplexer receiving the outputs of said T-latches respectively;

clock means producing said clock signals at said fraction of the main clock frequency;

means responsive to said fractional-rate clock signals for operating said first T-latch switch and said first multiplexer switch in antiphase so that when one switch is open the other is closed and vice versa; and means responsive to said fractional-rate clock signals for operating said second T-latch switch and said second multiplexer switch in antiphase.

3. Apparatus as claimed in claim 2, wherein said clock signal responsive means operates said first switches in antiphase and operates said second switches in antiphase.

4. Apparatus as in claim 1, wherein said first and second datapath logic means process the corresponding data in parallel but offset in time by one main clock cycle.

5. In a pipelined data transmission system, the combination of:

means forming a plurality of data transmission paths each having an output;

T-latch registers having inputs connected to the outputs of each of said data transmission paths respectively;

a multiplexer having inputs coupled to the outputs of said T-latch registers respectively; and clock means activating said multiplexer and said T-latch registers in synchronism and in timed sequence to prevent the development of any transparent data path from the inputs of either of said T-latch registers to the output of said multiplexer.

6. Apparatus as claimed in claim 5, and including;

first and second switches in said T-latches respectively and receiving the inputs thereof;

first and second switches in said multiplexer receiving the outputs of said T-latches respectively;

clock means producing said clock signals at said fraction of the main clock frequency;

means responsive to said fractional-rate clock signals for operating said first T-latch switch and said multiplexer switch in antiphase so that when one switch is open the other is closed and vice versa; and means responsive to said fractional-rate clock signals for operating said second T-latch switch and said second multiplexer switch in antiphase.

7. Apparatus as claimed in claim 6, wherein said clock signal responsive means operates said first switches in antiphase and operates said second switches in antiphase.

8. Apparatus as in claim 5, wherein said first and second datapath logic means process the corresponding data in parallel but offset in time by one main clock cycle.

9. For use with high-speed data processing equipment wherein the flow of data has been split into at least two parallel datastreams each operating at a clock rate which is a fraction of a main clock rate;

a pipeline data transmission system comprising, in combination;

at least first and second registers receiving said split data streams respectively to be stored under clock control at a clock frequency which is a fraction of said main clock rate;

at least first and second datapath logic means having inputs coupled to the outputs of said first and second registers respectively and operable to process the data from each register in parallel and at said fractional clock rate;

first and second serially-connected T-latches, the input of said first T-latch being coupled to the output of one of said datapath logic means;

a third T-latch having its input coupled to the output of the other of said datapath logic means;

a multiplexer having first and second inputs coupled to the outputs of said second and third T-latches; and clock means activating said first, second and third T-latches and said multiplexer at said fractional-rate clock signal.

10. Apparatus as claimed in claim 9, including an inverter coupled between the output of said second T-latch and the corresponding multiplexer input.

11. Apparatus as claimed in claim 10, wherein said first and third T-latch inputs are operable by said clock signals to latch the data from both datapaths on the same clock edge.

12. Apparatus as claimed in claim 11, wherein the single datastream output of said multiplexer is activated by said fractional-rate clock means to clock the data from said first and second datapath logic means on alternating clock edges respectively.

13. Apparatus as claimed in claim 9, wherein said datapath logic means process the corresponding data in parallel and at the same time, with no offset.

* * * * *